United States Patent
Egger et al.

(10) Patent No.: US 8,850,170 B2
(45) Date of Patent: Sep. 30, 2014

(54) APPARATUS AND METHOD FOR DYNAMICALLY DETERMINING EXECUTION MODE OF RECONFIGURABLE ARRAY

(75) Inventors: Bernhard Egger, Seoul (KR); Dong-Hoon Yoo, Seoul (KR); Tai-Song Jin, Seoul (KR); Won-Sub Kim, Anyang-si (KR); Min-Wook Ahn, Seoul (KR); Jin-Seok Lee, Seoul (KR); Hee-Jin Ahn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 429 days.

(21) Appl. No.: 13/217,952

(22) Filed: Aug. 25, 2011

(65) Prior Publication Data

US 2012/0124351 A1    May 17, 2012

(30) Foreign Application Priority Data

Nov. 16, 2010   (KR) ........................ 10-2010-0114044

(51) Int. Cl.
  *G06F 15/80*   (2006.01)
  *G06F 11/34*   (2006.01)
  *G06F 9/38*    (2006.01)
  *G06F 15/78*   (2006.01)

(52) U.S. Cl.
  CPC ........ *G06F 15/7867* (2013.01); *G06F 11/3409* (2013.01); *G06F 9/38* (2013.01)
  USPC ................ 712/241; 712/24; 712/43; 712/229

(58) Field of Classification Search
  USPC ....................................................... 712/241
  See application file for complete search history.

(56) References Cited

U.S. PATENT DOCUMENTS

| | | | |
|---|---|---|---|
| 5,857,104 A | 1/1999 | Natarjan et al. | |
| 6,341,371 B1 * | 1/2002 | Tandri | 717/158 |
| 6,546,550 B1 | 4/2003 | Ogata et al. | |
| 7,836,291 B2 | 11/2010 | Yim et al. | |
| 2005/0268075 A1 * | 12/2005 | Caprioli et al. | 712/239 |
| 2007/0130568 A1 * | 6/2007 | Jung et al. | 718/104 |
| 2009/0070552 A1 | 3/2009 | Kanstein et al. | |

FOREIGN PATENT DOCUMENTS

| | | |
|---|---|---|
| JP | 3470948 | 9/2003 |
| JP | 3819572 | 6/2006 |
| JP | 2009-530924 | 8/2009 |
| KR | 10-0812346 | 3/2008 |

OTHER PUBLICATIONS

Mei et al, ADRES An Architecture with tightly coupled VLIW Processor and coarse-grained reconfigurable matrix, 2003, Springer-Verlag, FPL 2003, pp. 61-70.*
Wikipedia Method Stub, Nov. 2, 2009, Wikipedia, pp. 1-2.*

* cited by examiner

*Primary Examiner* — Robert Fennema
*Assistant Examiner* — Jyoti Mehta
(74) *Attorney, Agent, or Firm* — NSIP Law (57) ABSTRACT

An apparatus and method for dynamically determining the execution mode of a reconfigurable array are provided. Performance information of a loop may be obtained before and/or during the execution of the loop. The performance information may be used to determine whether to operate the apparatus in a very long instruction word (VLIW) mode or in a coarse grained array (CGA) mode.

17 Claims, 9 Drawing Sheets

APPARATUS AND METHOD FOR DYNAMICALLY DETERMINING EXECUTION MODE OF RECONFIGURABLE ARRAY

CROSS-REFERENCE TO RELATED APPLICATION(S)

This application claims the benefit under 35 U.S.C. §119(a) of Korean Patent Application No. 10-2010-0114044, filed on Nov. 16, 2010, in the Korean Intellectual Property Office, the entire disclosure of which is incorporated herein by reference for all purposes.

BACKGROUND

1. Field

The following description relates to a loop execution technique of a reconfigurable array.

2. Description of the Related Art

Reconfigurable architectures are computer architectures that have hardware structures that may be optimally reconfigured to perform each task.

Typical hardware processing alone may not be able to properly handle tasks because of the inherent inflexibility of hardware especially when the tasks are subject to modification. Software processing alone, unlike hardware processing, may provide flexibility and adaptability to various tasks, but the processing speed is generally lower than that of hardware processing.

Reconfigurable architectures have the capability of providing the benefits of both hardware processing and software processing, and have been attracting attention, especially in the field of digital signal processing.

There are various types of reconfigurable architectures that are available, for example, coarse-grained arrays (CGAs). A CGA includes a plurality of processing units, and is capable of being optimized for certain tasks by adjusting the connections between the processing units.

Reconfigurable architectures are also capable of utilizing very long instruction word (VLIW) machines. Recently, processing units that have two execution modes, i.e., CGA and VLIW modes, have been developed. The reconfigurable architectures that have both the CGA and VLIW modes may perform loop executions in the CGA mode and may perform other operations in the VLIW mode.

SUMMARY

In one general aspect, there is provided an apparatus for determining an execution mode of a reconfigurable array, the apparatus including a performance information acquisition unit configured to acquire performance information that comprises execution times of iterations of a loop in a very long instruction word (VLIW) mode and execution times of the iterations of the loop in a coarse grained array (CGA) mode, an execution time estimation unit configured to estimate an execution time of the loop, a code generation unit configured to generate at least one of a VLIW code and a CGA code for executing the loop in the VLIW mode and the CGA mode, respectively, and a mode determination unit configured to select one of the at least one of the VLIW code and the CGA code based on at least one of the performance information and the execution time estimate of the loop.

The execution time estimation unit may comprise a storage module configured to store an n-th execution time estimate that is an estimated execution time of an n-th iteration of the loop, a measurement module configured to acquire an n-th execution time measurement that is a measured execution time of the n-th iteration of the loop, and an update module configured to calculate an (n+1)-th execution time estimate using the n-th execution time estimate and the n-th execution time measurement, and to store the (n+1)-th execution time estimate in the storage module.

The update module may be further configured to calculate the (n+1)-th execution time estimate using an average of the n-th execution time estimate and the n-th execution time measurement.

The performance information may comprise a graph that comprises a VLIW performance graph representing the execution times of the iterations of the loop in the VLIW mode and a CGA performance graph representing the execution times of the iterations of the loop in the CGA mode, and the VLIW and CGA performance graphs may both be represented on a coordinate plane that has a number of iterations of the loop as a first axis and an execution time of the loop as a second axis.

The code generation unit may be further configured to generate both the VLIW code and CGA code, and the graph may comprise a threshold intersection, which is an intersection between the VLIW and CGA performance graphs.

If the number of iterations of the loop can be detected, the mode determination unit may detect the number of iterations of the loop, compare the number of iterations of the loop with a threshold intersection, and select whichever of the VLIW and CGA codes is more suitable based on the results of the comparison of the number of iterations of the loop with the threshold intersection.

If the number of iterations of the loop cannot be detected, the mode determination unit may compare the execution time estimate of the loop with a threshold intersection, and select whichever of the VLIW and CGA codes is more suitable based on the results of the comparison of the execution time estimate of the loop with the threshold intersection.

The mode determination unit may be further configured to insert stub code into the loop, and to control a mode switching of the reconfigurable array.

In another aspect, there is provided a method of determining an execution mode of a reconfigurable array, the method including acquiring performance information, which includes a VLIW performance graph representing the execution times of the iterations of the loop in the VLIW mode and a CGA performance graph representing the execution times of the iterations of the loop in the CGA mode, wherein the VLIW and CGA performance graphs are both represented on a coordinate plane that has a number of iterations of the loop as a first axis and an execution time of the loop as a second axis, in response to a threshold intersection existing on the graph, generating both VLIW and CGA codes for executing the loop in the VLIW and CGA modes, respectively, if the number of iterations of the loop can be detected, detecting the number of iterations of the loop, comparing the number of iterations of the loop with the threshold intersection, and selecting whichever of the VLIW and CGA codes is more suitable based on the results of the comparison of the number of iterations of the loop with the threshold intersection, and if the number of iterations of the loop cannot be detected, comparing the execution time estimate of the loop with the threshold intersection and selecting whichever of the VLIW and CGA codes is more suitable based on the results of the comparison of the execution time estimate of the loop with the threshold intersection.

The method may further comprise executing the loop in a mode corresponding to whichever of the VLIW and CGA codes is selected, measuring a time taken to execute the loop in the mode corresponding to whichever of the VLIW and CGA codes is selected, and updating the execution time estimate with the measured time.

In another aspect, there is provided a method for processing a loop in a reconfigurable array that includes a very long instruction word (VLIW) processing mode and a coarse-grained array (CGA) processing mode, the method including generating performance information about a loop to be processed that includes at least one of an estimated execution time of the loop and a VLIW and CGA performance processing graph, dynamically selecting either the VLIW processing mode or the CGA processing mode based on the generated performance information, and processing the loop in the selected processing mode.

The performance information may comprise the VLIW and CGA performance processing graph that represents the execution time of a loop on a first axis and the number of iterations of the loop on a second axis, and comprise a VLIW performance graph representing the execution time of the loop in VLIW mode and a CGA performance graph representing the execution time of the loop in CGA mode.

The VLIW and CGA performance graph may further comprise a threshold intersection, and the dynamically selecting may comprise selecting either the VLIW processing mode or the CGA processing made based on the threshold intersection.

The method may further comprise determining the number of iterations of the loop to be processed, wherein the VLIW mode processes a loop faster if the loop includes a number of iterations that is to a first side of the threshold intersection on the VLIW and CGA performance graph, and the CGA mode processes a loop faster if the loop includes a number of iterations that is to the other side of the threshold intersection on the VLIW and CGA performance graph.

The performance information may further comprise the estimated execution time which is estimated based on at least one previous execution time of the loop.

In response to not being able to detect the number of iterations of the loop, the dynamically selecting may comprise dynamically selecting either the VLIW mode or the CGA mode by comparing the estimated execution time of the loop with the VLIW and CGA performance graph.

The estimated execution time may be based on a plurality of previous execution times of the loop, and the most recent execution times may be given more weight when generating the estimated execution time estimate.

Each time the loop is executed, the estimated execution time may be updated based on the current execution time of the loop.

Other features and aspects may be apparent from the following detailed description, the drawings, and the claims.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Figure 1:
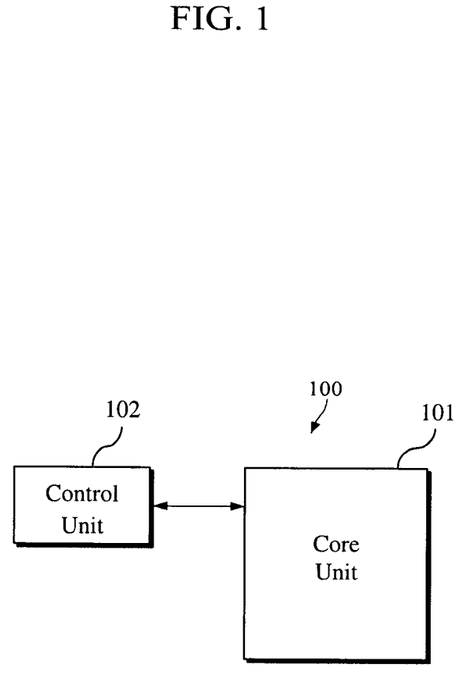
FIG. 1 is a diagram illustrating an example of a computing system.

FIG. 1 illustrates an example of a computing system. The computing system may be or may be included in a terminal such as a mobile terminal, a computer, a personal digital assistant (PDA), a smart phone, an MP3 player, and the like.

Referring to FIG. 1, computing system 100 includes a core unit 101 and a control unit 102.

The core unit 101 performs various instructions, operations, and tasks.

In various aspects described herein, the core unit 101 may operate in two execution modes. The execution modes are exclusive to each other, meaning that the core unit may only be in one of the modes at the same time. For example, the two exclusive execution modes may be a very long instruction word (VLIW) mode and a coarse-grained array (CGA) mode. As an example, a VLIW mode may be more suitable for processing a typical computation or loop operation with a small number of iterations. As another example, the CGA mode may be more suitable for processing a loop operation with a larger number of iterations.

The controller 102 may control the switching of an execution mode of the core unit 101. For example, loop operations may be performed in the VLIW mode or in the CGA mode based on their characteristics. The control unit 102 may dynamically select an execution mode for a given loop, and control the given loop to be performed in the selected execution mode.

Figure 2:
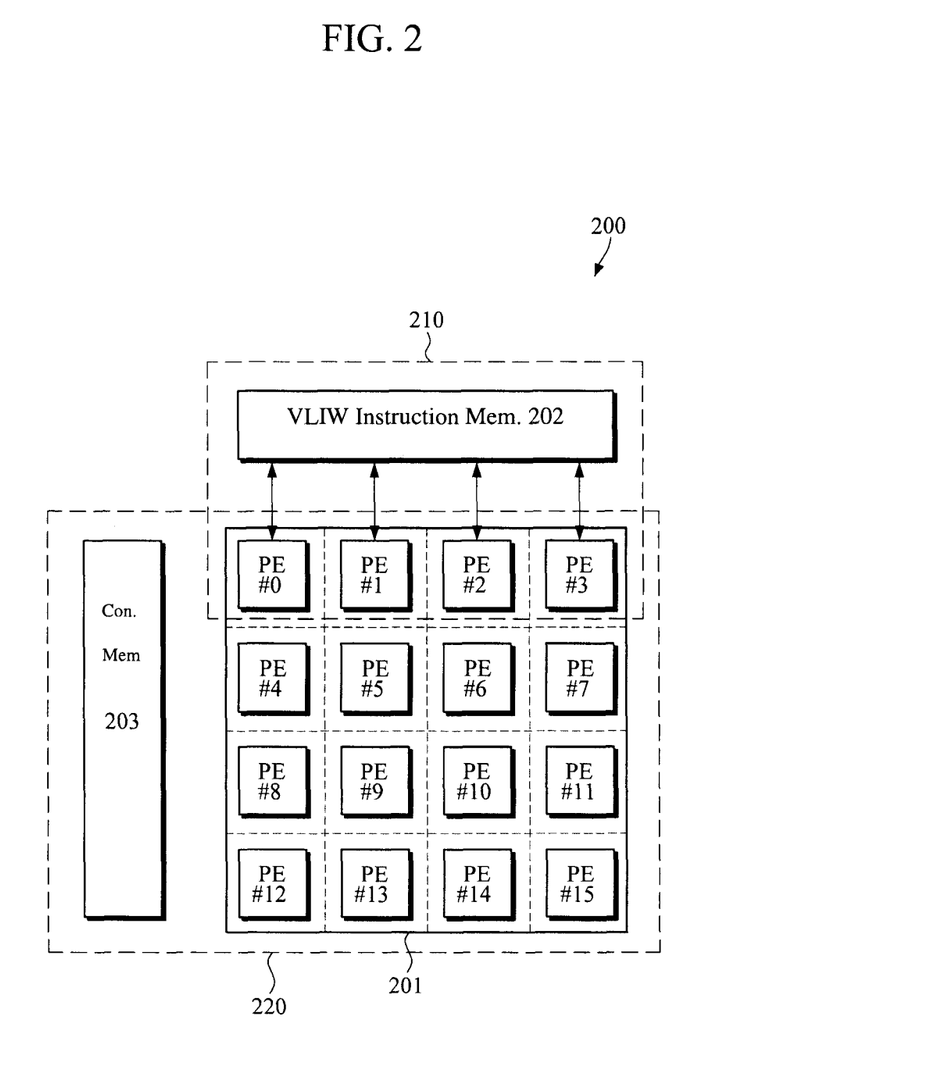
FIG. 2 is a diagram illustrating an example of a reconfigurable array.

FIG. 2 illustrates an example of a reconfigurable array. The reconfigurable array is an example of the core unit 101 of FIG. 1.

Referring to FIG. 2, reconfigurable array 200 includes a plurality of processing elements 201. In this example, the processing elements include PE#0 through PE#15.

PE#0 through PE#15 may process tasks in parallel. For example, PE#0 through PE#15 may simultaneously process a portion of or a whole operation or task that are not dependent on each other.

The reconfigurable array 200 may operate as a VLIW machine 210 in the VLIW mode, and may operate as a CGA machine 220 in the CGA mode.

For example, in the VLIW mode, processing elements PE#0 through PE#3 may operate as VLIW processors. While in the VLIW mode, processing elements PE#0 through PE#3 may execute a typical instruction or a loop instruction with a relatively small number of iterations, which are patched from a VLIW instruction memory 202.

As another example, in the CGA mode, processing elements PE#0 through PE#15 may operate as CGA processors. When operating as CGA processors, the processing elements PE#0 through PE#15 may be connected to one another. For example, an output port of PE#6 may be connected to an input port of PE#11. Various combinations are possible regarding the connection between the processing elements PE#0 through PE#15. As described herein, information about how the processing elements PE#0 through PE#15 are connected is referred to as configuration information. For example, the configuration information may be stored in a configuration memory 203. In the CGA mode, the structure of the reconfigurable array 200, i.e., the connections between PE#0 through PE#15, may be modified based on the configuration information that is stored in the configuration memory 203. Accordingly, the configuration of the processing elements may be more optimally modified to process a particular task or operation to be performed.

Figure 3:
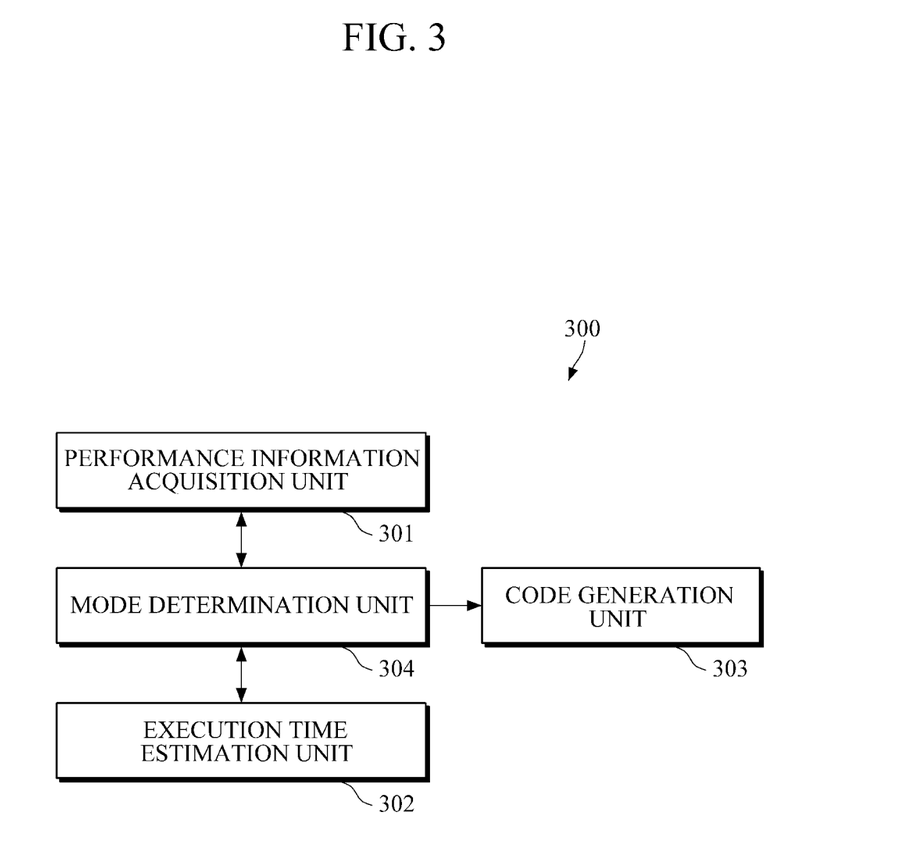
FIG. 3 is a diagram illustrating an example of an apparatus for determining the execution mode of a reconfigurable array.

FIG. 3 illustrates an example of an apparatus for determining the execution mode of a reconfigurable array. The apparatus for determining the execution mode is an example of the control unit 102 of FIG. 1.

Referring to FIG. 3, apparatus 300 includes a performance information acquisition unit 301, an execution time estimation unit 302, a code generation unit 303, and a mode determination unit 304.

The performance information acquisition unit 301 may acquire performance information that indicates the execution time, in each of the VLIW and CGA modes, of each iteration of a loop (hereinafter referred to as the loop) to be executed. As an example, the performance information may be represented, in a coordinate plane that has the number of iterations of the loop to be executed as a first axis and the execution time of the loop as a second axis. In this example, the graph may include a VLIW performance graph representing the execution time of the loop in the VLIW mode and a CGA performance graph representing the execution time of the loop in the CGA mode.

The more iterations the loop has, the more time the loop takes to execute. As an example, the VLIW and CGA performance graphs may be represented in an X-Y coordinate plane as straight lines with positive gradients. The execution time of the loop may vary from the VLIW mode to the CGA mode. Thus, the VLIW and CGA performance graphs may have different gradients.

If the VLIW and CGA performance graphs have different gradients, they may intersect with each other. The intersection between the VLIW and CGA performance graphs may be referred to as a threshold intersection. For example, as represented by the graph the VLIW mode may be more suitable than the CGA mode for a first section of the X-Y coordinate plane on a first side of the threshold intersection, and the CGA mode may be more suitable than the VLIW mode for a second section of the X-Y coordinate plane on the other side of the threshold intersection.

The execution time estimation unit 302 may estimate the execution time of the loop. For example, the execution time estimation unit 302 may store an n-th execution time estimate that is an estimated execution time of an n-th iteration of the loop. The execution time estimation unit 302 may acquire an n-th execution time measurement that is a measured execution time of the n-th iteration of the loop. In this example, the execution time estimation unit 302 may calculate an (n+1)-th execution time estimate based on the n-th execution time estimate and the n-th execution time measurement, and may update the n-th execution time estimate with the (n+1)-th execution time estimate. An execution time and an execution time estimate may be calculated as the number of execution cycles.

The code generation unit 303 may generate at least one of VLIW and CGA codes. As described herein, the VLIW code is code for executing the loop in the VLIW mode, and the CGA code is code for executing the loop in the CGA mode. Based on the performance information acquired by the performance information acquisition unit 301, the code generation unit 303 may generate one of the VLIW and CGA codes that are determined to be more suitable for the loop in terms of performance, or may generate both the VLIW and CGA codes.

The mode determination unit 304 may select one of the VLIW and CGA codes for the loop in terms of performance based on at least one of the performance information and the estimated execution time of the loop. The mode determination unit 304 may also determine whether the number of iterations of the loop can be detected. If the number of iterations of the loop can be detected, the mode determination unit 304 may detect the number of iterations of the loop. The mode determination unit 304 may compare the detected number of iterations of the loop with the threshold iteration acquired by the performance information acquisition unit 301, and may select one of the VLIW and CGA codes that is more suitable for the loop based on the results of the comparison.

If the number of iterations of the loop is not detected, the mode determination unit 304 may compare the execution time estimate provided by the execution time estimation unit 302 with the threshold iteration that is acquired by the performance information acquisition unit 301. The mode determination unit 304 may select one of the VLIW and CGA codes based on the results of the comparison.

For example, the mode determination unit 304 may insert a stub code into the loop to execute whichever of the VLIW and CGA codes is selected by the mode determination unit 304, and may control an execution mode switching.

Figure 4:
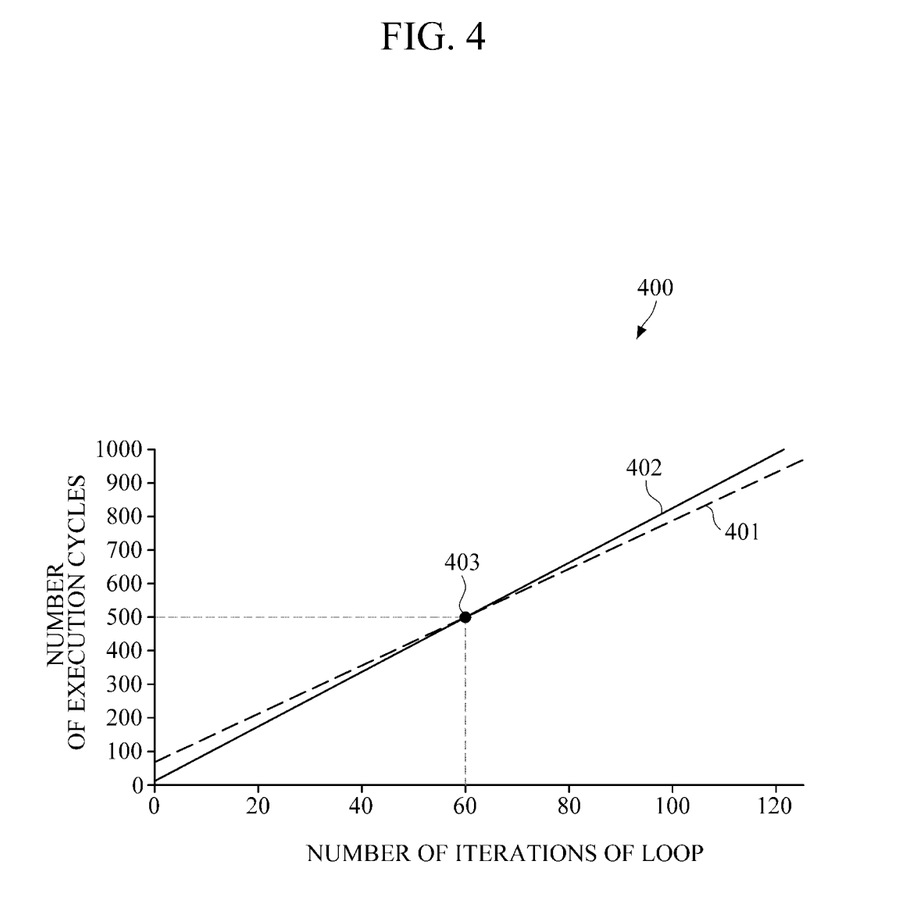
FIG. 4 is a diagram illustrating an example of performance information.

FIG. 4 illustrates an example of performance information. The performance information 400 is an example of the performance information that may be acquired by the performance information acquisition unit 301 of FIG. 3.

Referring to FIG. 4, performance information may include a VLIW performance graph 401 that illustrates the execution time measurements obtained in the VLIW mode and a CGA performance graph 402 that illustrates the execution time measurements obtained in the CGA mode. The VLIW and CGA performance graphs 401 and 402 may be represented on an X-Y coordinate plane that has an X axis representing the number of iterations of a loop and a Y axis representing loop execution time measurements.

The number of iterations of a loop indicates the number of times an operation included in a loop is repeated until the execution of the loop is complete, and may be represented as an iteration count. A loop execution time indicates the time it takes to execute a loop once, and may be represented as an execution cycle count.

The VLIW and CGA performance graphs 401 and 402 may both be represented as straight lines with positive gradients. Because the execution time of a loop varies from the VLIW mode to the CGA mode, the VLIW and CGA performance graphs 401 and 402 may have different gradients, and may intersect each other, thereby generating a threshold intersection 403.

For example, if the threshold intersection 403 is located at (60, 500), the VLIW mode may be more suitable than the CGA mode for a loop with 40 iterations, and the CGA mode may be more suitable than the VLIW mode for a loop with 80 iterations. In the example of FIG. 4, the VLIW mode is more desirable for loops with less than 60 iterations and the CGA mode is more desirable for loops with more than 60 iterations.

In this example, the VLIW mode takes less time to execute a loop with less than 60 iterations and the CGA mode takes less time to execute a loop with more than 60 iterations.

Performance information may be obtained at the stage of code compiling, and the time it takes to execute a loop in the VLIW mode may be calculated using Equation (1):

$$\text{Cycle count of VLIW mode} = (N * \text{latency of VLIW body}) + \text{VLIW loop overhead} \quad (1)$$

In Equation 1, N indicates the number of iterations of a loop, 'latency of VLIW body' indicates the number of cycles taken to execute the body of the loop, and 'VLIW loop overhead' indicates additional overhead (e.g., instruction patch cycles) that is used for the execution of the loop in the VLIW mode.

Referring to Equation (1), if 'latency of VLIW body' and 'VLIW loop overhead' are both determined, the VLIW performance graph 401 may be generated. The VLIW performance graph 401 illustrates the relationship between the number of iterations of a loop and the time it takes to execute the loop in the VLIW mode.

The time it takes to execute a loop in the CGA mode may be calculated using Equation (2):

$$\text{Cycle count of CGA mode} = (II * (N + \text{stages} - 1)) + \text{CGA loop overhead} \quad (2)$$

In Equation 2, II indicates an iteration interval between parallel processing stages, N indicates the number of iterations of a loop, 'stages' indicates the number of parallel processing stages, and 'CGA loop overhead' indicates additional overhead (e.g., configuration memory loading) that is used for the execution of a loop in the CGA mode.

Referring to Equation (2), if the II, 'stages,' and 'CGA loop overhead' are all determined, the CGA performance graph 402 may be determined. The CGA performance graph 402 illustrates the relationship between the number of iterations of a loop and the time it takes to execute the loop in the CGA mode.

Figure 5:
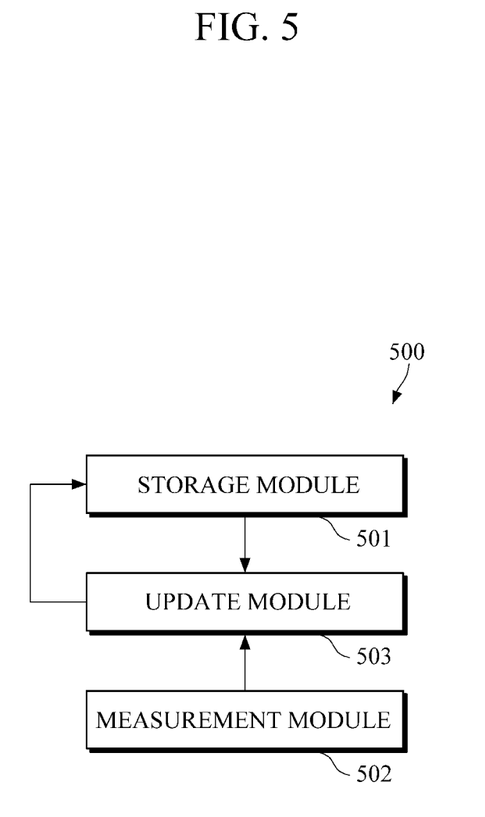
FIG. 5 is a diagram illustrating an example of an execution time estimation unit.

FIG. 5 illustrates an example of an execution time estimation unit. The execution time estimation unit is an example of the execution time estimation unit 302 of FIG. 3.

Referring to FIG. 5, execution time estimation unit 500 includes a storage module 501, a measurement module 502, and an update module 503.

The storage module 501 may store an n-th execution time estimate that is an estimated execution time of an n-th iteration of a loop. The estimation of the execution time of a loop is described later.

The measurement module 502 may measure the execution time of the n-th iteration of the loop and acquire an n-th execution time measurement. For example, the execution time of a loop may be measured by a function that measures from the beginning of the loop. Loops included in some tasks may be executed more than one time. An n-th iteration of a loop may indicate an n-th invocation of the loop.

The update module 503 may calculate an (n+1)-th execution time estimate based on the n-th execution time estimate that is stored in the storage module 501 and the n-th execution time measurement that is provided by the measurement module 502. The update module 503 may store the (n+1)-th execution time estimate in the storage module 501, thereby updating the n-th execution time estimate with the (n+1)-th execution time estimate.

Figure 6A:
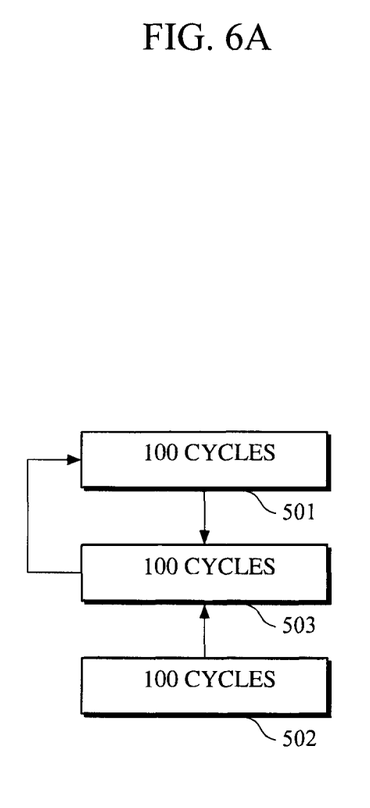
FIGS. 6A through 6C are diagrams illustrating examples of updating an estimated execution time.
Figure 6B:
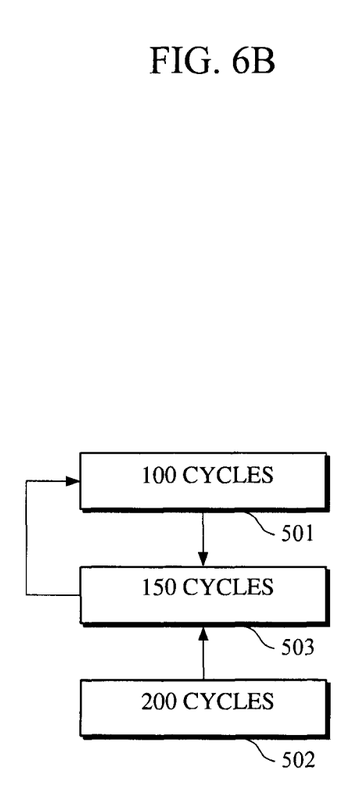
Figure 6C:
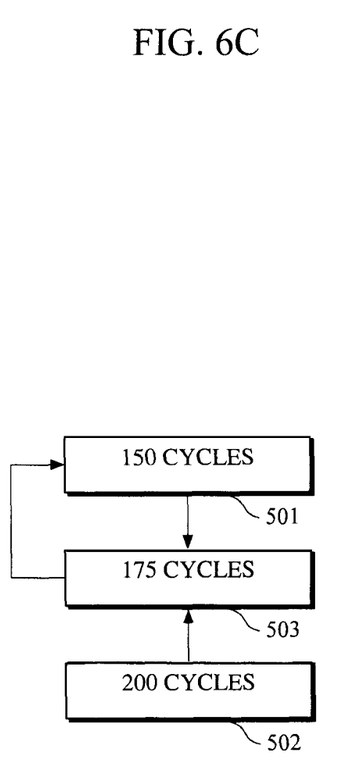

FIGS. 6A through 6C illustrate examples of updating an execution time estimate.

Referring to FIG. 6A, a default value of 100 cycles is initially stored in the storage module 501, and a loop is executed. A first iteration of the loop may be performed in any one of the VLIW and CGA modes. The measurement module 502 measures a first execution time of the loop, which is the time it takes to perform the first iteration of the loop.

For example, if a measured first execution time of the loop provided by the measurement module 502 is 100 cycles, the update module 503 may compute a weighted sum of the default value of 100 cycles and the measured first execution time of the loop, thereby obtaining a value of 100 cycles. The update module 503 may apply a weight of 50% to the default value of 100 cycles and to the measured first execution time of the loop. The weighted sum of the default value of 100 cycles and the measured first execution time of the loop, i.e., the value of 100 cycles, may be computed as an estimated second execution time of the loop. Accordingly, the update module 503 may store the value of 100 cycles in the storage module 501 as the estimated second execution time of the loop.

Before a second iteration of the loop begins, the mode determination unit 304 illustrated in FIG. 3 may determine whether to execute the loop in the VLIW or CGA mode. For example, the mode determination unit 304 may determine which mode to execute the loop in based on the estimated second execution time of the loop stored in the storage module 501. For example, if the second execution time estimate is 100 cycles and performance information corresponding to the loop is as shown in FIG. 4, the mode determination unit 304 may compare the estimated second execution time of the loop with the threshold intersection 403. In this example, the mode determination unit 304 determines that the VLIW is more suitable than the CGA mode for the loop based on the results of the comparison.

Referring to FIG. 6B, the second iteration of the loop is performed. If the VLIW mode is determined to be more suitable than the CGA mode for the second iteration of the loop, VLIW code is selected and is then executed. The measurement module 502 may measure the second execution time of the loop, as described above with reference to FIG. 6A. If a second measured execution time of the loop provided by the measurement module 502 is 200 cycles, the update module 503 may compute a weighted sum of the estimated execution time (100 cycles) and the second measured execution times (200 cycles) of the loop by applying a weight of 50% to each of the estimated and measured second execution times of the loop, and may store a value of 150 cycles obtained by the computation in the storage module 501 as an estimated third execution time of the loop.

Before a third iteration of the loop begins, the mode determination unit 304 may determine whether to execute the loop in the VLIW or CGA mode by comparing the estimated third execution time of the loop that is stored in the storage module 501 with the threshold intersection 403.

Referring to FIG. 6C, the third iteration of the loop is performed. The measurement module 502 may measure the third execution time of the loop. If a measured third execution time of the loop provided by the measurement module 502 is 200 cycles, the update module 503 may compute a weighted sum of the estimated execution time (150 cycles) and measured third execution times (200 cycles) of the loop by applying a weight of 50% to each of the estimated and measured third execution times of the loop, and may store a value of 175 cycles obtained by the computation in the storage module 501 as an estimated fourth execution time of the loop.

Before a fourth iteration of the loop begins, the mode determination unit 304 may determine whether to execute the loop in the VLIW or CGA mode by comparing the estimated third execution time of the loop that is stored in the storage module 501 with the threshold intersection 403.

In certain aspects, an execution time estimate may be calculated by applying a higher weight to a more recently-measured execution time than a less-recently-measured execution time. For example, if the measured first, second, third, fourth, and fifth execution times of a loop are 50 cycles, 50 cycles, 60 cycles, 60 cycles, and 60 cycles, respectively, it might be more likely that a measured sixth execution time of the loop will be 60 cycles. In this example, it is possible to dynamically determine an execution mode for a loop based on the characteristics of the loop.

Figure 7:
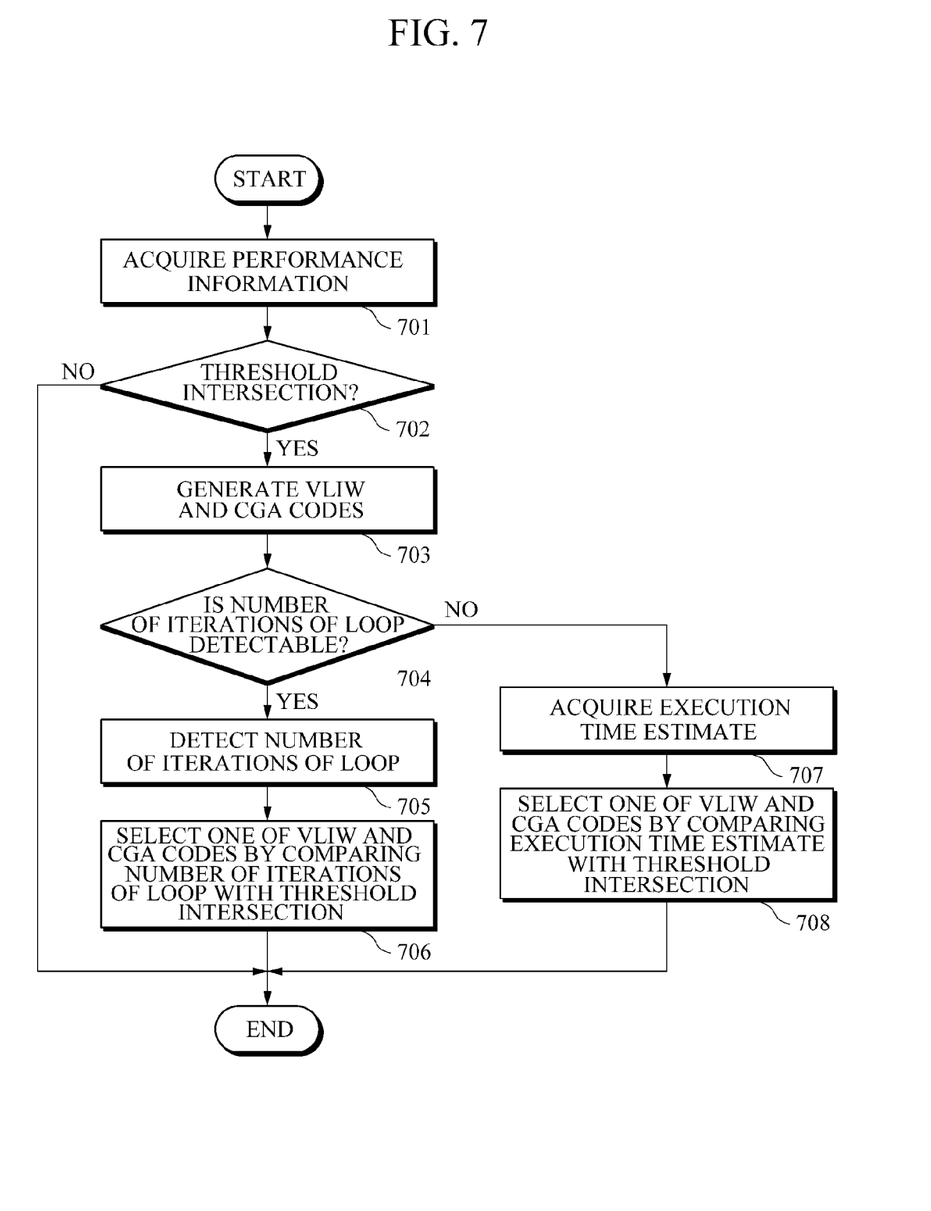
FIG. 7 is a diagram illustrating an example of a method for determining the execution mode of a reconfigurable array.

FIG. 7 illustrates an example of a method for determining the execution mode of a reconfigurable array.

Referring to FIG. 7, performance information corresponding to a loop is obtained, in 701. For example, the performance information acquisition unit 301 illustrated in FIG. 3 may acquire the performance information that is shown in FIG. 4 using Equations (1) and (2).

In 702 a determination is made as to whether the performance information includes a threshold intersection. For example, the mode determination unit 304 illustrated in FIG. 3 may detect the threshold intersection 403 illustrated in FIG. 4 from the performance information.

Once a threshold intersection is detected from the performance information, VLIW and CGA codes are both generated, in 703. For example, the code generation unit 303 illustrated in FIG. 3 may generate the VLIW code for executing the loop in the VLIW mode, and the CGA code for executing the loop in the CGA mode, under the control of the mode determination unit 304.

A determination is made as to whether the number of iterations of the loop can be detected, in 704. For example, the mode determination unit 304 may determine, before or during the execution of the loop, whether the number of iterations of the loop can be detected.

If the number of iterations of the loop can be detected, the mode determination unit 304 detects the number of iterations of the loop, in 705, and selects whichever of the VLIW and CGA codes is more suitable than the other code for the loop, in 706, by comparing the performance information with the threshold intersection detected from the performance information, e.g., the threshold intersection 403. For example, referring to FIG. 4, if the number of iterations of the loop is less than 60, the VLIW code is selected and is then executed in the VLIW mode. As another example, if the number of iterations of the loop is greater than 60, the CGA code is selected and is then executed in the CGA mode.

If the number of iterations of the loop cannot be detected, the mode determination unit 304 acquires an execution time estimate of the loop, in 707, and selects whichever of the VLIW and CGA codes is more suitable than the other code for the loop, in 708, by comparing the acquired execution time estimate with the threshold intersection detected from the performance information. For example, referring to FIG. 4, if an n-th execution time estimate of the loop is less than 500 cycles, the VLIW code is selected and is then executed in the VLIW mode. As another example, if the n-th execution time estimate of the loop is greater than 500 cycles, the CGA code is selected and is then executed in the CGA mode.

As described above, it is possible to dynamically determine the execution mode of a loop based on performance information and an execution time estimate of the loop. Accordingly, it is possible to further optimize the execution of the loop.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable laptop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for determining an execution mode of a reconfigurable array, the apparatus comprising:
   a performance information acquisition unit configured to acquire performance information that comprises execution times of iterations of a loop in a very long instruction word (VLIW) mode and execution times of the iterations of the loop in a coarse grained array (CGA) mode;

an execution time estimation unit configured to estimate an execution time of the loop by calculating an (n+1)-th execution time estimate based on a stored n-th execution time estimate and an n-th execution time measurement;

a code generation unit configured to generate at least one of a VLIW code and a CGA code for executing the loop in the VLIW mode and the CGA mode, respectively; and a mode determination unit configured to select at least one of the VLIW code and the CGA code based on at least one of the performance information and the execution time estimate of the loop.

2. The apparatus of claim 1, wherein the execution time estimation unit comprises:

a storage module configured to store the n-th execution time estimate that is an estimated execution time of an n-th iteration of the loop;

a measurement module configured to acquire the n-th execution time measurement that is a measured execution time of the n-th iteration of the loop; and an update module configured to calculate the (n+1)-th execution time estimate and to store the (n+1)-th execution time estimate in the storage module.

3. The apparatus of claim 2, wherein the update module is further configured to calculate the (n+1)-th execution time estimate using an average of the n-th execution time estimate and the n-th execution time measurement.

4. The apparatus of claim 1, wherein the performance information comprises a graph that comprises a VLIW performance graph representing the execution times of the iterations of the loop in the VLIW mode and a CGA performance graph representing the execution times of the iterations of the loop in the CGA mode, and the VLIW and CGA performance graphs are both represented on a coordinate plane that has a number of iterations of the loop as a first axis and an execution time of the loop as a second axis.

5. The apparatus of claim 4, wherein the code generation unit is further configured to generate both the VLIW code and CGA code, and the graph comprises a threshold intersection, which is an intersection between the VLIW and CGA performance graphs.

6. The apparatus of claim 4, wherein, if the number of iterations of the loop can be detected, the mode determination unit detects the number of iterations of the loop, compares the number of iterations of the loop with a threshold intersection, and selects whichever of the VLIW and CGA codes is more suitable based on the results of the comparison of the number of iterations of the loop with the threshold intersection.

7. The apparatus of claim 4, wherein, if the number of iterations of the loop cannot be detected, the mode determination unit compares the execution time estimate of the loop with a threshold intersection, and selects whichever of the VLIW and CGA codes is more suitable based on the results of the comparison of the execution time estimate of the loop with the threshold intersection.

8. The apparatus of claim 1, wherein the mode determination unit is further configured to insert stub code into the loop to execute whichever of the VLIW and CGA codes is selected, and to control a mode switching of the reconfigurable array.

9. A method of determining an execution mode of a reconfigurable array, the method comprising:

acquiring performance information, which includes a VLIW performance graph representing execution times of iterations of a loop in a VLIW mode and a CGA performance graph representing execution times of iterations of the loop in a CGA mode, wherein the VLIW and CGA performance graphs are both represented on a coordinate plane that has a number of iterations of the loop as a first axis and an execution time of the loop as a second axis;

in response to a threshold intersection existing on the graph, generating both VLIW and CGA codes for executing the loop in the VLIW and CGA modes, respectively;

if the number of iterations of the loop can be detected, detecting the number of iterations of the loop, comparing the number of iterations of the loop with the threshold intersection, and selecting whichever of the VLIW and CGA codes is more suitable based on the results of the comparison of the number of iterations of the loop with the threshold intersection; and if the number of iterations of the loop cannot be detected, comparing an execution time estimate of the loop with the threshold intersection and selecting whichever of the VLIW and CGA codes is more suitable based on the results of the comparison of the execution time estimate of the loop with the threshold intersection.

10. The method of claim 9, further comprising executing the loop in a mode corresponding to whichever of the VLIW and CGA codes is selected, measuring a time taken to execute the loop in the mode corresponding to whichever of the VLIW and CGA codes is selected, and updating the execution time estimate with the measured time.

11. A method for processing a loop in a reconfigurable array that includes a very long instruction word (VLIW) processing mode and a coarse-grained array (CGA) processing mode, the method comprising:

generating performance information about a loop to be processed that includes at least one of an estimated execution time of the loop, which is obtained by calculating an (n+1)-th execution time estimate based on a stored n-th execution time estimate and an n-th execution time measurement, and a VLIW performance graph and a CGA performance graph;

dynamically selecting either the VLIW processing mode or the CGA processing mode based on the generated performance information; and processing the loop in the selected processing mode.

12. The method of claim 11, wherein the performance information comprises a VLIW and CGA performance graph that represents the execution time of a loop on a first axis and the number of iterations of the loop on a second axis, and comprises the VLIW performance graph representing the execution time of the loop in VLIW processing mode and the CGA performance graph representing the execution time of the loop in CGA processing mode.

13. The method of claim 12, wherein the VLIW and CGA performance graph further comprises a threshold intersection, and the dynamically selecting comprises selecting either the VLIW processing mode or the CGA processing made based on the threshold intersection.

14. The method of claim 12, further comprising determining the number of iterations of the loop to be processed, wherein the VLIW processing mode processes a loop faster than the CGA processing mode if the loop includes a number of iterations that is to a first side of the threshold intersection on the VLIW and CGA performance graph, and the CGA processing mode processes a loop faster than the VLIW processing mode if the loop includes a number of iterations that is to the other side of the threshold intersection on the VLIW and CGA performance graph.

15. The method of claim 12, wherein, in response to not being able to detect the number of iterations of the loop, the dynamically selecting comprises dynamically selecting either the VLIW processing mode or the CGA processing mode by comparing the estimated execution time of the loop with the VLIW and CGA performance graph.

16. The method of claim 12, wherein the estimated execution time is based on a plurality of previous execution times of the loop, and the most recent execution times are given more weight than less recent execution times when generating the estimated execution time estimate.

17. The method of claim 12, wherein each time the loop is executed, the estimated execution time is updated based on a current execution time of the loop.

* * * * *